(12) United States Patent
Indiresan et al.

(10) Patent No.: US 11,240,154 B2
(45) Date of Patent: Feb. 1, 2022

(54) DYNAMIC HARDWARE FORWARDING PIPELINE COMPRESSION

(71) Applicant: CISCO TECHNOLOGY, INC., San Jose, CA (US)

(72) Inventors: Atri Indiresan, Sunnyvale, CA (US);
Manas Pati, San Jose, CA (US);
Chunjen Wang, Milpitas, CA (US);
Christophe Rene, Gatineau (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/742,544

(22) Filed: Jan. 14, 2020

(65) Prior Publication Data
US 2021/0218674 A1    Jul. 15, 2021

(51) Int. Cl.
*H04L 12/00*    (2006.01)
*H04L 12/741*   (2013.01)
*H04L 12/933*   (2013.01)

(52) U.S. Cl.
CPC ........ *H04L 45/745* (2013.01); *H04L 49/1546* (2013.01)

(58) Field of Classification Search
CPC .......... H04J 11/00; H04L 45/50; H04L 5/001; H04W 36/14; H04W 40/00; H04W 40/02; H04W 84/042; H04W 88/08; H04W 88/16
See application file for complete search history.

(56) References Cited

U.S. PATENT DOCUMENTS

| | | | |
|---|---|---|---|
| 9,654,424 B2 | 5/2017 | Pfaff | |
| 10,200,284 B2* | 2/2019 | Wang | ................ H04L 45/54 |
| 10,237,378 B1* | 3/2019 | Seshadri | ............. H04J 3/0697 |
| 2014/0241356 A1* | 8/2014 | Zhang | ................ H04L 45/54 |
| | | | 370/392 |
| 2015/0319057 A1* | 11/2015 | Jocha | ................ H04L 43/062 |
| | | | 370/241.1 |
| 2016/0226967 A1* | 8/2016 | Zhang | ............... H04L 49/9068 |

OTHER PUBLICATIONS

"International Search Report and Written Opinion issued in International Patent Application No. PCT/US2021/012692 filed Jan. 8, 2021", dated Apr. 14, 2021, 17 pages.
Kaljic, et al., "A Survey on Data Plane Flexibility and Programmability in Software-Defined Networking", arxiv.org, Cornell University Library, 201 Olin Library Cornell University Ithaca, NY 14853, Mar. 12, 2019 (Mar. 12, 2019), XP081162490, 38 pages.

* cited by examiner

*Primary Examiner* — Phuc H Tran
(74) *Attorney, Agent, or Firm* — Johnson, Marcou, Isaacs & Nix, LLC

(57) ABSTRACT

A controller device for a network provides data associated with pipeline capabilities of a programmable switch. The programmable switch receives data associated with pipeline capabilities of the programmable switch. The pipeline capabilities include a plurality of flow tables and allowable table transitions for each of the flow tables. The programmable switch determines that a first flow table and a second flow table are mutually independent based on the allowable table transitions for each of the flow tables. The programmable switch configures a pipeline for data flow in the computing device, the pipeline comprising a plurality of pipeline stages, a particular pipeline stage comprising the first flow table and the second flow table.

20 Claims, 8 Drawing Sheets

230

Method to configure a physical flow table pipeline in a programmable switch

310

Programmable switch creates a graph with tables as nodes numbered sequentially and next tables as links between the nodes. A second table has a greater number than a first table

320

The programmable switch determines if a table is dependent on a preceding table. If a sequence of next table transitions from a first table to a second table exists, the programmable switch determines that the second table is dependent on the first table.

330

The programmable switch 120 determines if a table is independent of a preceding table. The programmable switch 120 determines if a sequence of next table transitions from a first table to a second table does not exist

340

Programmable switch configures pipeline stages sequentially

350

Programmable switch assigns dependent flow tables to pipeline stages sequentially until the next table is independent of a previous table

360

Programmable switch assigns independent tables to a single pipeline stage, allocating a table size that is the sum of the sizes of the independent tables 370 More flow tables to assign? — Yes (loop back to 350) / No 240, Fig. 2

Fig. 3

```
== 0 - Table0 ==
max entries: 330
next tables: 1, 2, 3

== 1 - Table1 ==
max entries: 135
next tables: 2, 3

== 2 - Table2 ==
max entries: 200
next tables: 4, 5

== 3 - Table3 ==
max entries: 500
next tables: 4, 5

== 4 - Table4 ==
max entries: 1000
next tables: 5

== 5 - Table5 ==
max entries: 500
next tables:
```

Fig. 4

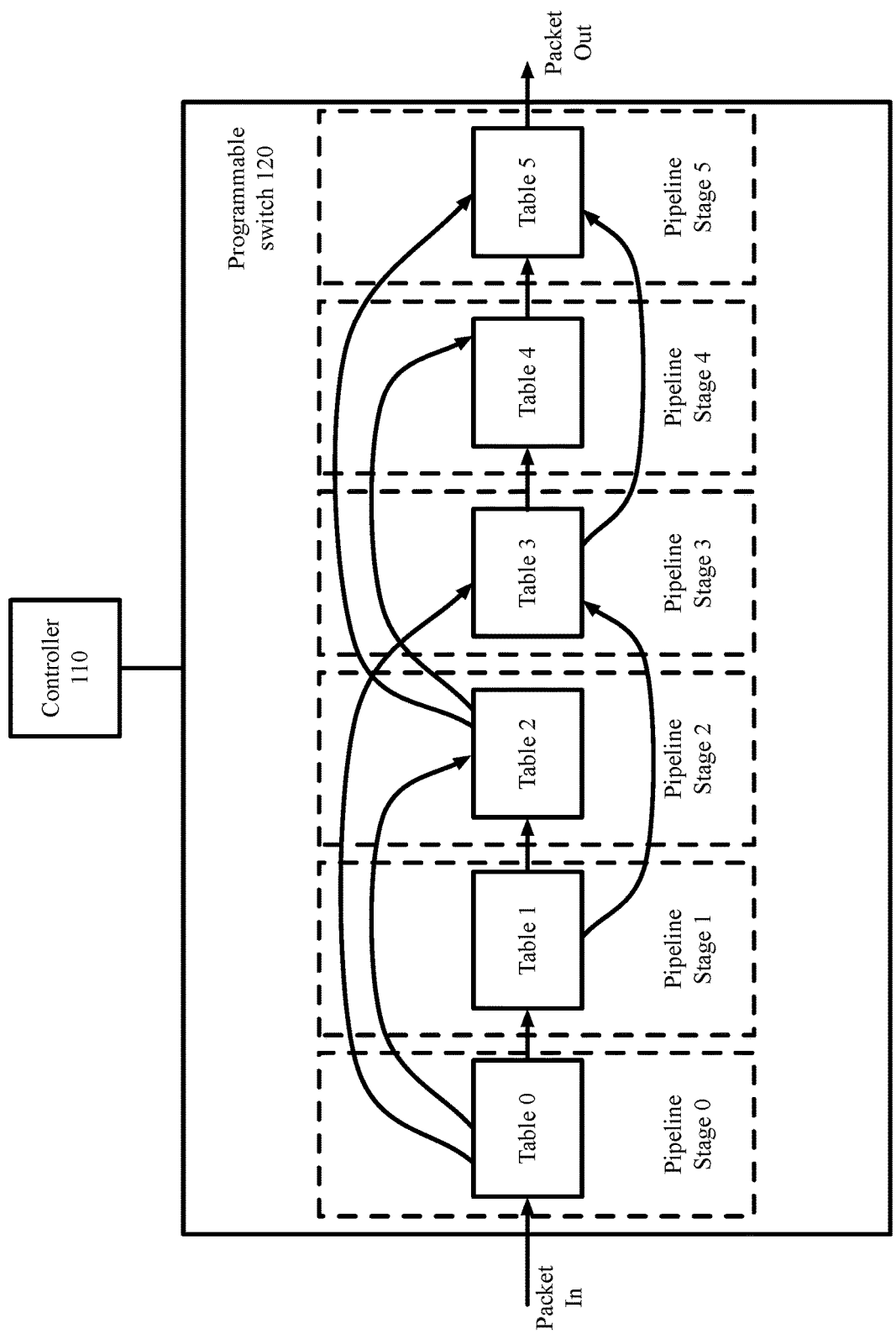
Fig. 5
(Conventional)

DYNAMIC HARDWARE FORWARDING PIPELINE COMPRESSION

TECHNICAL FIELD

This disclosure relates to dynamic hardware forwarding pipeline progression and, more specifically, to dynamically configuring pipelines of programmable switches to access mutually independent tables arranged in parallel in a single pipeline stage.

BACKGROUND

In conventional network systems, programmable switches process data packets and/or pass the data packets along the network. Data packets are received by a programmable switch via an input port and forwarded from the programmable switch via an output port. The programmable switch includes a virtual pipeline of linked flow tables that are executed between receipt of a packet via the input port and forwarding of the packet via the output port. The virtual pipeline comprises multiple pipeline stages, and each pipeline stage comprises a single flow table. The pipeline configuration of the programmable switch manages the manner in which data packets flow through the flow tables in the pipeline stages. A data packet progresses through the pipeline by moving from stage to stage in the sequential order of the tables in the pipeline.

The flow tables may be sequentially numbered and start with a first table, such as Table 0. A data packet may only pass through a flow table to a higher number flow table in sequential order. Each flow table includes one or more flow entries. When a particular flow table receives a data packet, if the data packet matches an entry of the particular flow table, the data packet executes instructions provided by that entry of the particular flow table before progressing to the next table.

In a conventional network system, a data packet may be directed in the GoToTable instructions of a table to logically skip a table in the next pipeline stage. While the subsequent table and stage may be logically skipped, the packet must still physically pass through the next pipeline stage to reach a subsequent stage or an output port.

Examples of these conventional systems include OpenFlow or Protocol Independent Switch Architectures ("PISA"), such as P4. Each table in these systems expresses a logical function, such as a match on a key or a set of keys. Instructions in the flow tables include actions, such as packet modifications, forwarding actions, or instructions for the next table to process. One property of a pipeline stage is the set of the next tables that are possible as an action. The set of next tables may be explicitly stated (for example, via OpenFlow Table Feature Message) or implied by the program flow (for example, via P4).

BRIEF DESCRIPTION OF THE DRAWINGS

FIG. 3 is a block flow diagram depicting a method to configure flow tables in a programmable switch, in accordance with certain examples.

FIG. 4 is an example set of flow tables for a programmable switch, in accordance with certain examples.

FIG. 5 is a diagram depicting an example conventional programmable switch operating the instructions of FIG. 4.

DETAILED DESCRIPTION

Overview

Figure 1:
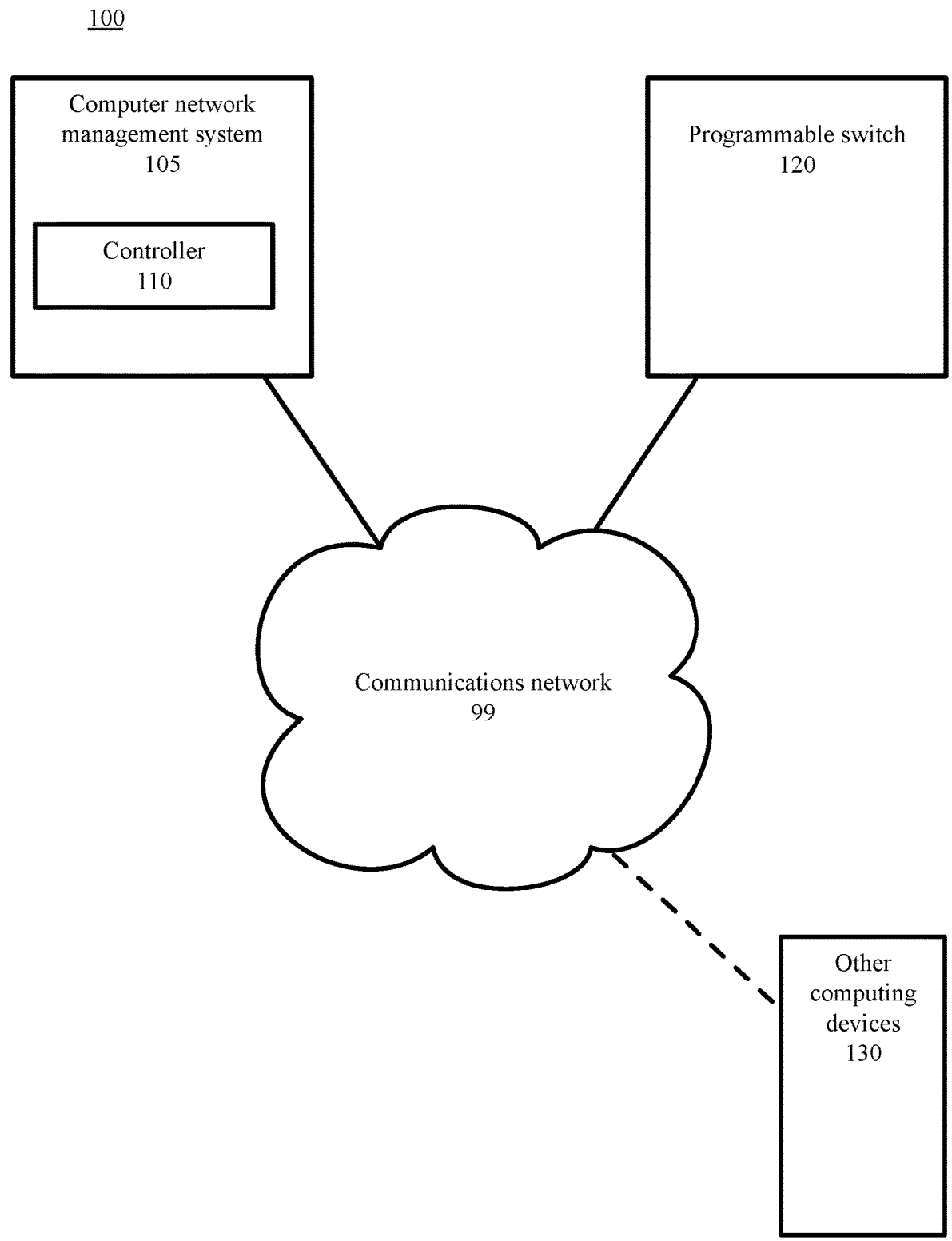
FIG. 1 is a block diagram depicting a communications and processing architecture to compress forwarding pipelines, in accordance with certain examples.

Pipeline configurations for programmable switches include attributes of the flow tables of the programmable switch. The attributes may include "max_entries," "next_tables" (the set of tables to which a flow in this table may direct a packet for further processing), and other attributes. In a typical flow table, other entries are included, such as match and action entries. The match entries comprise input ports, packet header fields, metadata from a previous flow table, or other entries. Action entries include actions for the programmable switch to take, such as to forward the data packet to a specific port.

Certain tables are allowed to forward data packets only to a fixed set of other tables. In an example, Table 2 has GoToTable options for Tables 4 or 5, but not Table 3; or Table 3 has GoToTable options for Tables 4 or 5, but not Table 2. Since a direct or indirect path from Table 2 to Table 3 does not exist, Tables 2 and 3 are mutually exclusive and independent of one another. In a conventional programmable switch operating these instructions, when the data packet is logically forwarded from the first table to the third table, the data packet still must physically pass through the second pipeline stage to get to the third table in the third pipeline stage.

In a network system employing programmable switches using the technology presented herein, a network controller communicates with one or more programmable switches and manages the operations of the switches. The controller can add, modify, or delete the flow entries in each flow table of a programmable switch.

The programmable switch creates a dependency graph for the set of tables based on the GoToTable operations. The graph indicates if any two tables are independent of one another because a sequence of GoToTable operations from one table to the next sequential table does not exist. Consecutive flow tables are thus mutually independent when an earlier flow table in the sequence may not transmit data packets to a subsequent flow table in the sequence. If the graph indicates that two flow tables are independent, then the programmable switch can modify the configuration of the tables in each stage of the pipeline. The programmable switch arranges the pipeline such that independent flow tables are positioned in parallel in the same physical pipeline stage, rather than being arranged in series in separate pipeline stages.

When a flow table recognizes the flow entries of the data packet, the flow table may direct the data packet to a flow table in a subsequent pipeline stage that will match the data packet, but also will not match a second table in the same pipeline stage. The data packet will match the flows in only one of the tables in the single pipeline stage, but not any of the other tables in the same pipeline stage. The data packet is not required to attempt a match with the other flow tables in the pipeline stage that have flow entries that will not produce a match due to being mutually exclusive with the matched table. From the matched flow table, the data packet is directed to a subsequent flow table in a subsequent pipeline stage that is after each of the parallel flow tables or to an output port of the programmable switch. Thus, the data packet does not flow through parallel tables in a single pipeline stage that do not have a match. Avoiding a number of the tables saves time and processing capacity.

In conventional systems, even if tables are logically ignored, the data packets are required to physically pass through every sequential pipeline stage until a match is identified. Because the number of pipeline stages may be limited by the type of programmable switch, in certain cases the data packet must be transferred through the conventional pipeline more than once if the number of tables is more than the number of pipeline stages. For example, a switch may be programmed to process tables 0-7 in pipeline stages 1-8 through a first pass of the data packet through the switch, and the switch may be programmed to process tables 8-15 in the pipeline stages 1-8 through a second pass of the data packet through the switch. The attempted matching of each flow table and the multiple passes through the conventional pipeline require additional processing capacity, time, and power.

The present technology allows the pipeline to be compressed. The compression can reduce the number of passes through the pipeline, saves the programmable switch from unnecessary attempts at matching flow tables, and saves processing capacity, time, and power. In an example, if a programmable switch has 8 pipeline stages and 10 tables with only two tables in parallel, the tables will require 9 pipeline stages by compressing two of the tables into a single stage. Thus, two passes will be needed to service 9 pipeline stages because the switch is limited to 8 pipeline stages. Conversely, if the programmable switch includes parallel tables in two pipeline stages, then only 8 compressed pipeline stages will be required for the 10 tables. Thus, the programmable switch will only require a single pass in this example.

These and other aspects, objects, features, and advantages of the examples will become apparent to those having ordinary skill in the art upon consideration of the following detailed description of illustrated examples.

Example System Architecture

In example architectures for the technology, while each server, system, and device shown in the architecture is represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

FIG. 1 is a block diagram depicting a communications and processing architecture 100 for network management. As depicted in FIG. 1, the architecture 100 includes a computer network management system 105, one or more programmable switches 120, and a one or more other computing devices 130 connected by communications network 99. The computer network management system 105 uses distributed databases. In general, the computer network management system 105 can employ a variety of tools, applications, and devices to assist human network managers in monitoring and maintaining networks.

The computer network management system 105 employs a controller 110 to configure flow tables and other functions of the programmable switch 120. The controller 110 communicates with the programmable switch 120 to analyze capacities, configurations, and structures of the programmable switch 120 and configures operations of the programmable switch 120 to perform the required methods, processes, or functions.

Most computer network management architectures use the same basic structure and set of relationships. Programmable switches 120 may run software that processes data packets and/or passes the data packets along the network. In an example, the programmable switch 120 is an application-specific integrated circuit or any other suitable programmable hardware or software circuit switch. Data packets are received by a programmable switch 120 via an input port and forwarded from the programmable switch 120 via an output port. The programmable switch 120 includes a pipeline of linked flow tables that provide matching, forwarding, and data packet modifications.

Other computing devices 130 may be any other suitable network devices, such as other programmable switches or other network components.

Each of the computer network management system 105, programmable switch 120, and other computing devices 130, includes one or more wired or wireless telecommunications systems by which network devices may exchange data. For example, the computer network management system 105, programmable switch 120, and other computing devices 130 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages.

Throughout the discussion of example examples, it should be understood that the terms "data" and "information" are used interchangeably herein to refer to text, images, audio, video, or any other form of information that can exist in a computer-based environment.

Each network device, such as computer network management system 105, programmable switch 120, and other computing devices 130, can include a communication subsystem capable of transmitting and receiving data over the network(s). For example, each network device can include a server, or a partition of a server, router virtual machine (VM) or container, a portion of a router, a desktop computer, a laptop computer, a tablet computer, a television with one or more processors embedded therein and/or coupled thereto, a smart phone, a handheld computer, a personal digital assistant (PDA), or any other wired or wireless processor-driven device. In some examples, a user associated with a device must install an application and/or make a feature selection to obtain the benefits of the technology described herein.

The illustrated network connections are examples and other approaches for establishing a communications link between the computers and devices can be used. Additionally, those having ordinary skill in the art and having the benefit of this disclosure will appreciate that the network devices illustrated in FIG. 1 may have any of several other suitable computer system configurations and may not include all the components described above.

Figure 8:
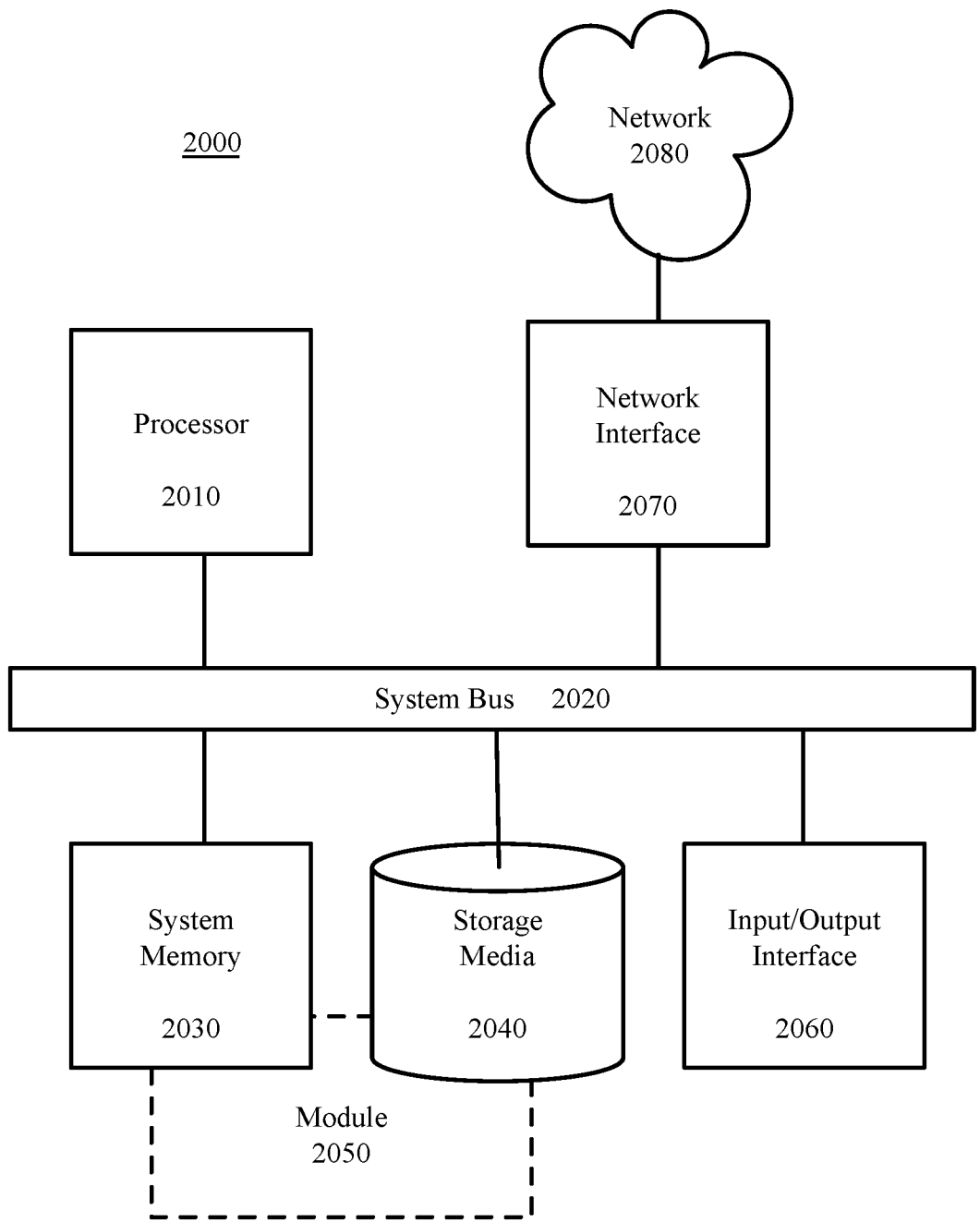
FIG. 8 depicts a computing machine and a module in accordance with certain examples.

In example examples, the network computing devices, and any other computing machines associated with the technology presented herein, may be any type of computing machine such as, but not limited to, those discussed in more detail with respect to FIG. 8. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 8. The computing machines discussed herein may communicate with one another, as well as with other computing machines or communication systems, over one or more networks, such as network 99. Each network may include various types of data or communications networks, including any of the network technology discussed with respect to FIG. 8.

Example Processes

Figure 2:
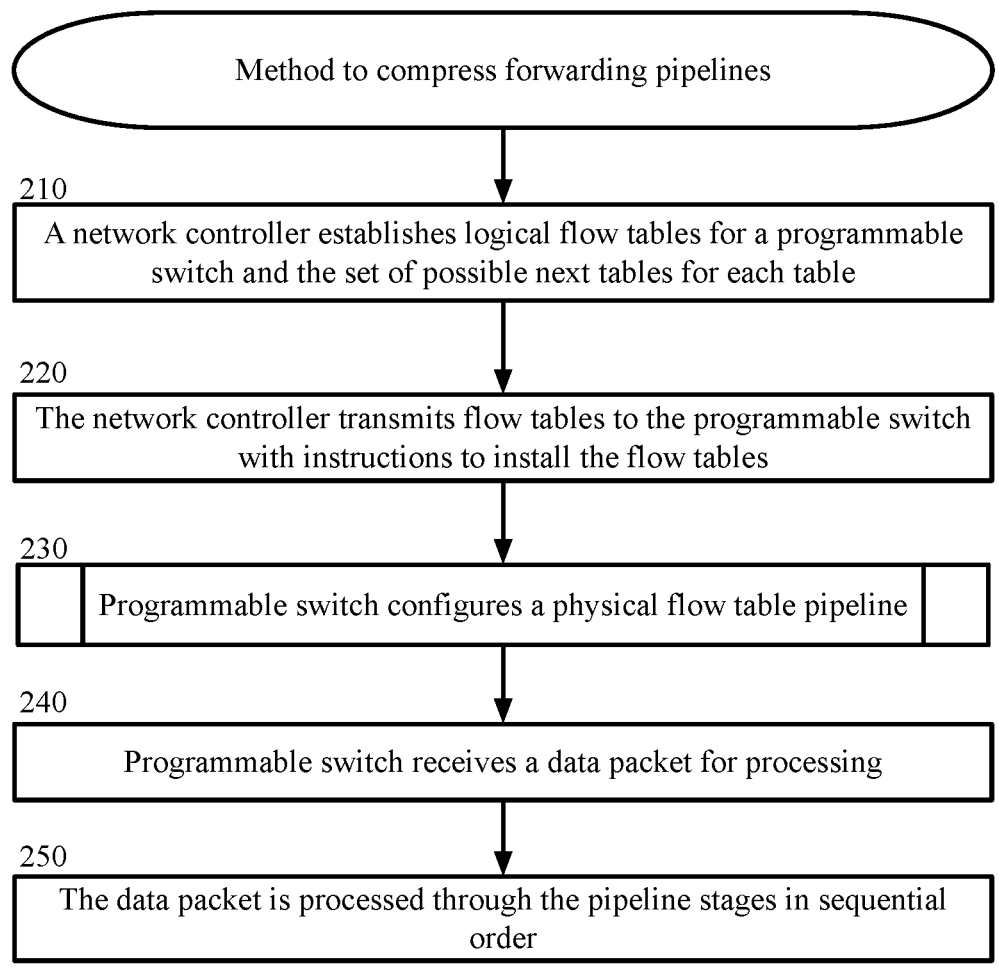
FIG. 2 is a block flow diagram depicting a method to compress forwarding pipelines, in accordance with certain examples.

The example methods illustrated in FIGS. 2-3 are described hereinafter with respect to the components of the example communications and processing architecture 100. The components of the example communications and processing architecture 100 may include, but are not limited to, routers, switches, network hubs, wireless access points, network cables, network servers, and network interface cards. The example methods of FIGS. 2-3 may also be performed with other systems and in other environments. The operations described with respect to any of FIGS. 2-3 can be implemented as executable code stored on a computer or machine readable non-transitory tangible storage medium (e.g., hard disk, ROM, EEPROM, nonvolatile RAM, CD-ROM, flash memory, random access memory (RAM), static random access memory (SRAM), dynamic random access memory (DRAM), and synchronous dynamic random access memory (SDRAM), etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

FIG. 2 is a block flow diagram depicting a method 200 to compress forwarding pipelines, in accordance with certain examples.

In block 210, a controller 110 establishes logical flow tables for the programmable switch 120 and specifies a table size and a set of possible next tables for each table. For each flow table, the controller 110 creates the flow table and assigns the flow table a number. The controller 110 establishes each flow entry on the flow tables, such as the size of the flow table or an action that the flow table may take. The controller 110 establishes a GoToTable table configuration that dictates other flow tables, if any, to which the flow table may forward a data packet.

In a programmable network, software functionality separates the programming of a network device from the underlying hardware and provides a centralized, programmable network that can quickly adapt to changing network requirements. The controller 110 communicates with the programmable switch 120 and other network devices, such as other computing devices 130, to configure the communication paths, device configurations, and other functions of the network. The controller 110 configures the flow entries of each of the flow tables for communication to the programmable switch 120.

In block 220, the controller 110 transmits the flow tables to the programmable switch 120 with instructions to install the flow tables. After receiving data about the programmable switch 120 and establishing the table flow entries, the controller 110 communicates the flow tables to the programmable switch 120 to allow the flow tables to be assigned to pipeline stages in the programmable switch 120.

The controller 110 communicates with the programmable switch 120 via any type of digital communication protocol over a wired or wireless network, such as communications network 99. The controller 110 may poll the programmable switch 120 to determine the hardware and software capacity and capabilities of the programmable switch 120. Based on the data retrieved or extracted from the programmable switch 120, the communication may determine the characteristics of each of the flow tables of the programmable switch 120. In an example, the controller 110 configures the characteristics of each of the flow tables of the programmable switch 120 and other pipeline capabilities by communicating instructions and data related to the pipeline capabilities to the programmable switch 120. The instructions cause the programmable switch 120 to change or implement the desired flow table entries for each flow table.

In alternate examples, the flow tables are configured directly by the programmable switch 120. That is, the programmable switch 120 assesses the capacities and configurations of the physical and logical characteristics of the programmable switch 120 and configures the flow tables accordingly.

FIG. 4 is an example set of flow tables for a programmable switch 120. The proposed pipeline includes flow tables for Table 0 through Table 5. Each flow table includes attributes "max_entries" and "next_tables." The next tables attribute establishes a set of tables to which a particular table may direct a data packet for further processing. The max_entries data depicts a size of the flow table that dictates the maximum number of flow entries that can be configured on the flow table. In a typical flow table, other entries are included, such as match and action entries. The match entries may comprise input ports, data packet header fields, metadata from a previous flow table, or other entries. Action entries include actions for the programmable switch to take, such as to forward the data packet to a specific port.

In the example of FIG. 4, certain tables are allowed to forward data packets only to a fixed set of other tables. For example, Table 2 has GoToTable options for Tables 4 or 5, but not Table 3. Table 3 has GoToTable options for Tables 4 or 5, but not Table 2. Since a direct or indirect path from Table 2 to Table 3 does not exist, Tables 2 and 3 are mutually exclusive and independent of one another. In contrast, a path from Table 1 to Tables 2 and 3 does exist. Thus, Tables 2 and 3 are dependent on Table 1. Similarly, Table 4 is dependent on Tables 2 and 3, and Table 5 is dependent on Tables 2, 3 and 4.

Returning to FIG. 2, in block 230, the programmable switch 120 configures a physical flow table pipeline. Block 230 is described in further detail hereinafter with reference to FIG. 3.

FIG. 3 is a block flow diagram depicting a method 230 to configure a physical flow table pipeline in a programmable switch 120, in accordance with certain examples.

In block 310, the programmable switch 120 creates a graph with tables as nodes numbered sequentially and next tables as links between the nodes. A subsequent table has a greater number than a previous table. For example, a previous table might be designated as Table 0 and subsequent tables numbered sequentially as Table 1, Table 2, . . . Table N. The graph may indicate the allowable table transitions available from each table to subsequent tables. Since tables may only forward data packets to higher sequential tables and the flow entries may limit the subsequent tables to which the data packets may be forwarded, the graph will indicate the possible flow options.

In alternate examples, a graph is not created, but other methods are used to depict the next table options in a programmable switch. For example, a logic table, a flow chart, a chart as depicted in FIG. 4, or other suitable representation of the next table options may be used.

In block 320, the programmable switch 120 determines if a table is dependent on a preceding table. If a sequence of next table transitions from a first table to a second table exists, the programmable switch 120 determines that the second table is dependent on the first table. That is, if a transition from Table 1 to Table 2 exists, then Table 2 is dependent on Table 1. If a transition from Table 1 to Table 2 does not exist, then Table 2 is not dependent on Table 1. Next table transitions, or GoToTable entries, provide one or more tables to which a data packet may be forwarded from a particular table. For example, Table 0 might have GoToTable entries of Tables 1, 2, and 4. These available transitions from Table 0 are represented in the graph. The method of block 320 is performed for each table in the programmable switch 120 to determine the table dependencies of each table.

In block 330, the programmable switch 120 determines if a table is independent of a preceding table. The programmable switch 120 determines if a sequence of next table transitions from a first table to a second table does not exist. If the sequence does not exist, the programmable switch 120 determines that the second table is independent of the first table. That is, if a transition from Table 1 to Table 2 does not exist, then Table 2 is independent of Table 1. In this example, a data packet may not be forwarded from Table 1 to Table 2. Table 1 has GoToTable entries that list other tables, but not Table 2. Therefore, Tables 1 and 2 are independent of each other. The method of block 330 is performed for each table in the programmable switch 120 to determine the table dependencies of each table.

In block 340, the programmable switch 120 configures pipeline stages sequentially. The programmable switch 120 identifies each pipeline stage and determines the sequential flow of the pipeline stages. For example, pipeline stage 0 is followed by pipeline stage 1, then pipeline stage 2. Each pipeline stage will host one or more flow tables. In a conventional system each pipeline stage will only host a single flow table (for each pass through the pipeline). In the present technology, more than one flow table may be hosted by a single pipeline stage as described herein.

In block 350, the programmable switch 120 assigns dependent flow tables to pipeline stages sequentially until the next table is independent of a previous table. Beginning with the first flow table, the programmable switch 120 proceeds sequentially and places each flow table in the next sequential pipeline stage. For example, the first flow table, such as Table 0, is placed in the first pipeline stage, such as pipeline stage 0. After placing Table 0, the programmable switch 120 places the next flow table in the next pipeline stage, such as Table 1 into pipeline stage 1. This process continues until the next flow table for placement in a pipeline stage is identified as being independent with the previously placed flow table.

In block 360, the programmable switch 120 assigns independent tables to a single pipeline stage, allocating a table size that is the sum of the sizes of the independent tables. The programmable switch 120 determined in block 330 whether two flow tables are independent of one another. When the programmable switch 120 attempts to place the next flow table in the next pipeline stage, the programmable switch 120 recognizes that the next flow table is independent of another flow table and places the independent flow tables in the same pipeline stage.

In an example, Table 1 and Table 2 were determined to be independent of each other in block 330. After the programmable switch 120 in the example places Table 0 in pipeline stage 0, the programmable switch 120 places Table 1 in pipeline stage 1. When the programmable switch 120 reviews Table 2 for placement next, the programmable switch 120 recognizes that Table 1 and Table 2 are independent. The programmable switch 120 determines that Table 1 and Table 2 may be placed together in pipeline stage 1. The two independent flow tables may be hosted by a single pipeline stage because a data packet will only ever be forwarded to one of the tables in that pipeline stage. That is, if a transition from Table 1 to Table 2 does not exist, and thus Table 2 is independent of Table 1, then Table 1 and Table 2 may be placed in the same pipeline stage.

The programmable switch 120 allocates a size for the pipeline stage that is equal to the sum of the sizes of Tables 1 and 2. The programmable switch 120 determines the size of Table 1 and the size of Table 2, sums the sizes, and allocates that size to the pipeline stage.

In block 370, the method 230 determines if more flow tables need to be assigned. If more flow tables are to be assigned, the method 230 proceed to follow the "Yes" branch to block 350. The programmable switch again assigns dependent flow tables to pipeline stages sequentially until the next table is independent of a previous table. For example, after placing Table 1 and Table 2 in the same pipeline stage 1 as described above in block 360, the programmable switch 120 determines that additional flow tables, such as Table 3, require assigning. The programmable switch 120 would thus repeat the functions of block 350.

If a subsequent independent set of tables are identified, the method 230 again proceeds to block 360.

If the method 230 proceeds to block 370 and the programmable switch 120 does not have additional flow tables to be assigned, the method 230 proceeds to follow the "No" branch to return to block 240 or FIG. 2.

An example algorithm for determining the placement of the tables may be as follows:

```
1.   for each table i /* from 0 to n */
2.       get the set of GoToTable targets
3.       for each target table j
4.           set table[j].predecessor = i
5.           if (i == 0)
6.               table[0].pipeline_stage = 0
7.           else
8.               table[i].pipeline_stage =
                   table[table[i].predecessor].pipeline_stage + 1
9.               /* set the pipeline stage to the one after its largest
                   predecessor */
```

In this example algorithm, the programmable switch 120 assigns a table to a pipeline stage that is 1 more than the pipeline stage of the last table that has a GoToTable to this table. In line 4 of the algorithm, two tables, Tables 5 and 6, are in pipeline stages 2 and 3 respectively. If both Tables 5 and 6 have a GoToTable to Table 7, then Table 7 must be after both Tables 5 and 6. That is, Table 7 must be at least in pipeline stage 4. Since the predecessor gets updated in the order of tables, the last predecessor table is known, ignoring any earlier predecessor tables. For example, if table 0 has GoToTable [1, 2], then Tables 1 and 2 have predecessor Table 0. If Table 1 can forward a data packet to Table 3, then Table 2 still has predecessor Table 0. Therefore, Tables 1 and 2 will both forward data packets to the pipeline stage that must be after Table 0, such as pipeline stage 2.

Returning to FIG. 2, in block 240, the programmable switch 120 receives a data packet for processing. After the programmable switch 120 is configured as described herein, a data packet is transmitted to the programmable switch 120. The data packet may be provided by the controller 100, another programmable switch 120, or any other suitable device or module that communicates data packets in a network.

In block 250, the data packet is processed through the pipeline stages in sequential order. As described herein, when a pipeline stage has two flow tables in the pipeline stage, only the table that has flow entries that match the flow entries on the data packet receives the data packet.

When the data packet is received by a new table, the programmable switch 120 again performs the process of block 250 to determine where the data packet may be forwarded from the new table. The process repeats until the data packet is forwarded to an output port or instructions in the table halt the data packet flow.

Processing of data packets in a conventional programmable switch 120 will be described with reference to FIG. 5. Thereafter, processing of data packets in a programmable switch 120 employing the technology disclosed herein will be described. In both cases, the data packets will be processed based on the table configuration described with reference to FIG. 4.

FIG. 5 is a diagram depicting an example of a conventional programmable switch 120 executing the instructions of FIG. 4. The network 100 includes a controller 110 that is able to configure flow tables of the programmable switch 120. The diagram depicts a data packet being received at an input port of the programmable switch 120. The data packet may be received from another programmable switch 120 or any other computing device 130.

Each table in FIG. 5, such as Table 0, 1, 2, 3, 4, or 5, is in a single pipeline stage 0 through 5, respectively. Each physical pipeline stage includes a single table. The data packet is initially transferred to the first table, Table 0, which is in pipeline stage 0. With reference to the flow table of Table 0 in FIG. 2, Table 0 may provide GoToTable instructions to transfer the data packet to Tables 1, 2, or 3, or an output instruction to an output port. The logical transferring of the data packet (but not physical transferring) to one of the Tables 1, 2, or 3 is represented by the arrows from Table 0 to each of Tables 1, 2, or 3.

In an example, if the data packet is logically forwarded from Table 0 to Table 2, the data packet still must physically pass through pipeline stage 1 to get to Table 2 in pipeline stage 2. If the data packet is transferred to Table 2, with reference to the flow table of Table 2 in FIG. 4, Table 2 may forward the data packet to Table 4 or Table 5, or to an output port, but not to Table 3. Even though the data packet is logically forwarded from Table 2 to one of Table 4 or Table 5, the data packet still must physically pass through pipeline stage 3 to Table 4 in pipeline stage 4 (or through both pipeline stages 3 and 4 to Table 5 in pipeline stage 5). If the data packet is transferred to Table 3, with reference to the flow table of Table 3 in FIG. 4, Table 3 may forward the data packet to Table 4 or Table 5, or to an output port, but not Table 2.

Thus, in this conventional network system, the data packet may be directed in the GoToTable instructions of a table to logically skip the only table in the next pipeline stage. While the subsequent table and stage may be logically skipped, the data packet still must physically pass through the next pipeline stage to reach the destination. Conventional systems do not allow programmable switches to compress multiple exclusive tables into a single pipeline stage.

Figure 6:
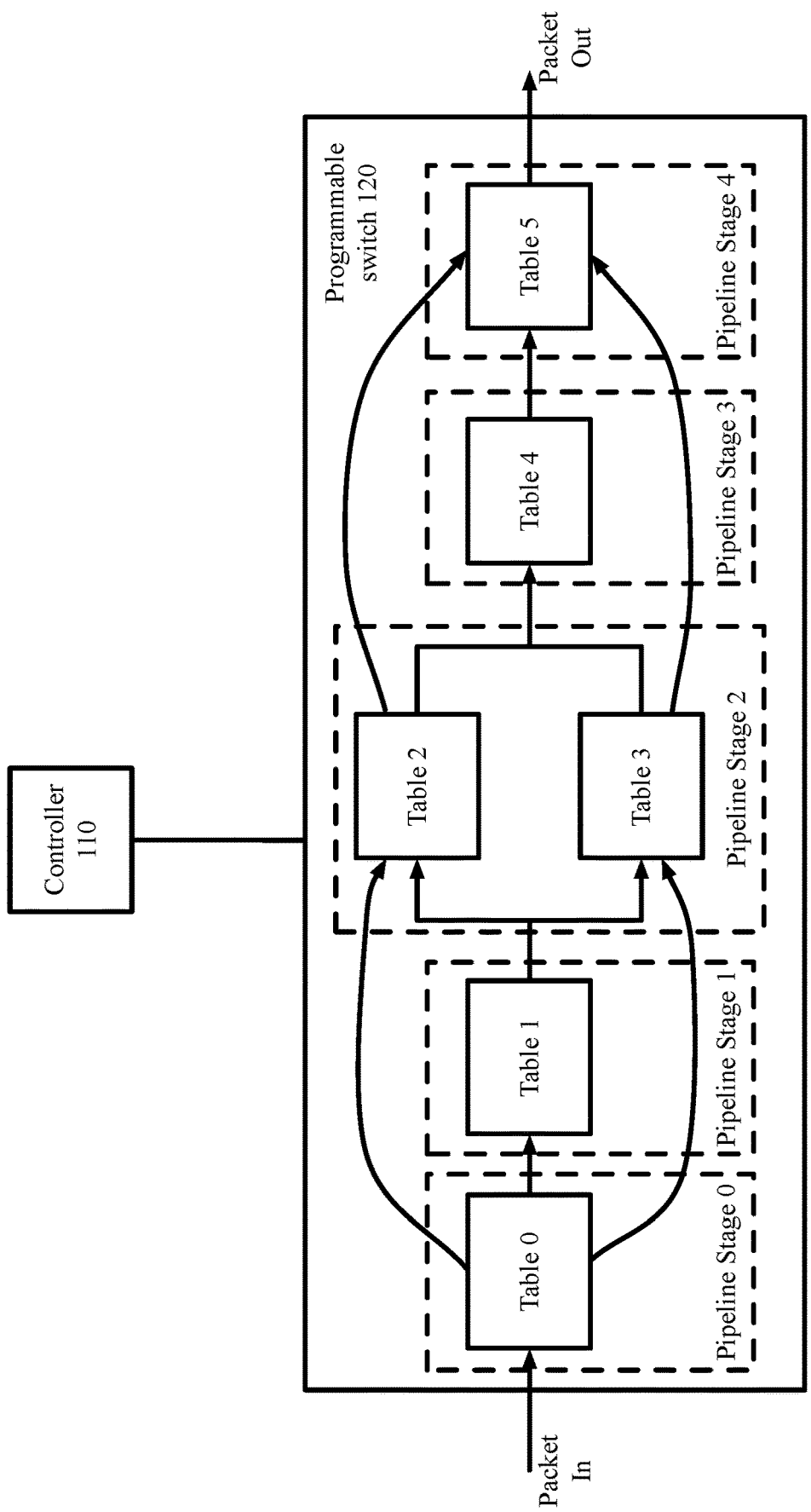
FIG. 6 is a diagram depicting a programmable switch operating the instructions of FIG. 4 and compressing two tables into a single pipeline stage, in accordance with certain examples.

FIG. 6 is a diagram depicting a programmable switch 120 executing the instructions of FIG. 4 and compressing two tables into a single pipeline stage, in accordance with certain examples. A controller 110 communicates with a programmable switch 120 to configure the pipeline. The programmable switch 120 receives the flow table data and configures the pipeline such that independent tables that have mutually exclusive flow entries are configured in a single pipeline stage. Tables 2 and 3 are located in the same pipeline stage 2 because Tables 2 and 3 may only GoTo Tables 4 or 5 and not to each other, as illustrated in the flow tables of FIG. 4. Therefore, the two independent tables are placed in the same pipeline stage.

The programmable switch 120 receives a data packet from any suitable source, such as another programmable switch 120 or any suitable other computing device 130. The data packet is provided first to Table 0. Table 0 may forward the data packet to Table 1, Table 2, or Table 3, or to an output port.

If the data packet is transferred to Table 2, as shown in the flow table of Table 2 in FIG. 4, Table 2 may forward the data packet to Table 4 or Table 5, or to an output port, but not Table 3. Because Tables 2 and 3 are in the same pipeline stage 2, the data packet received by Table 2 is logically forwarded to one of Table 4 or Table 5. Because Table 3 is in the same pipeline stage as Table 2, the data packet received by Table 2 is not required to physically pass through an additional pipeline stage that includes Table 3.

If the data packet is transferred to Table 3 from Table 0, with reference to the flow table of Table 3 in FIG. 4, Table 3 may forward the data packet to Table 4 or Table 5, or an output port, but not Table 2. Similarly, an additional pipeline stage is not required for Table 2 for a data packet transiting from Table 0 to Table 3.

In an example test case to illustrate possible table combinations, Tables 2 and 3 are independent and arranged in parallel in a single pipeline stage. The configuration described in this example, is illustrated in FIG. 6, as presented previously.

Table 1 has GoToTable entries of Tables 2 and 3, and Tables 2 and 3 have GoToTable entries of 4 and/or beyond. The flow entries of Tables 2 and 3 may include:

Table 1: match srcMac=X, action goto_table:2
Table 1: match srcMac=Y, action goto_table:3
Table 2: match destMac=A, action: output:5
Table 3: match destMac=A, action: output:10

In the example, the controller is communicating that a data packet from X is to go to destination A via port 5, and a data packet from Y is to go to destination A via port 10. Tables 2 and 3 do not have GoToTables for each other. Thus, a table graph of the system would show that Tables 2 and 3 are independent of each other.

If the programmable switch 120 in the example combines Tables 2 and 3 in a single pipeline stage, the programmable switch 120 can ensure that the correct entry is matched by including the logical table ID in the key. Thus, the entries might include:

Pipeline stage 1: match table=1, srcMac=X, action goto_table:2, set next_table=2

Pipeline stage 1: match srcMac=Y, action goto_table:3, set next_table=3

Pipeline stage 2: match table=2, destMac=A, action: output:5

Pipeline stage 2: match table=3, destMac=A, action: output:10

Figure 7:
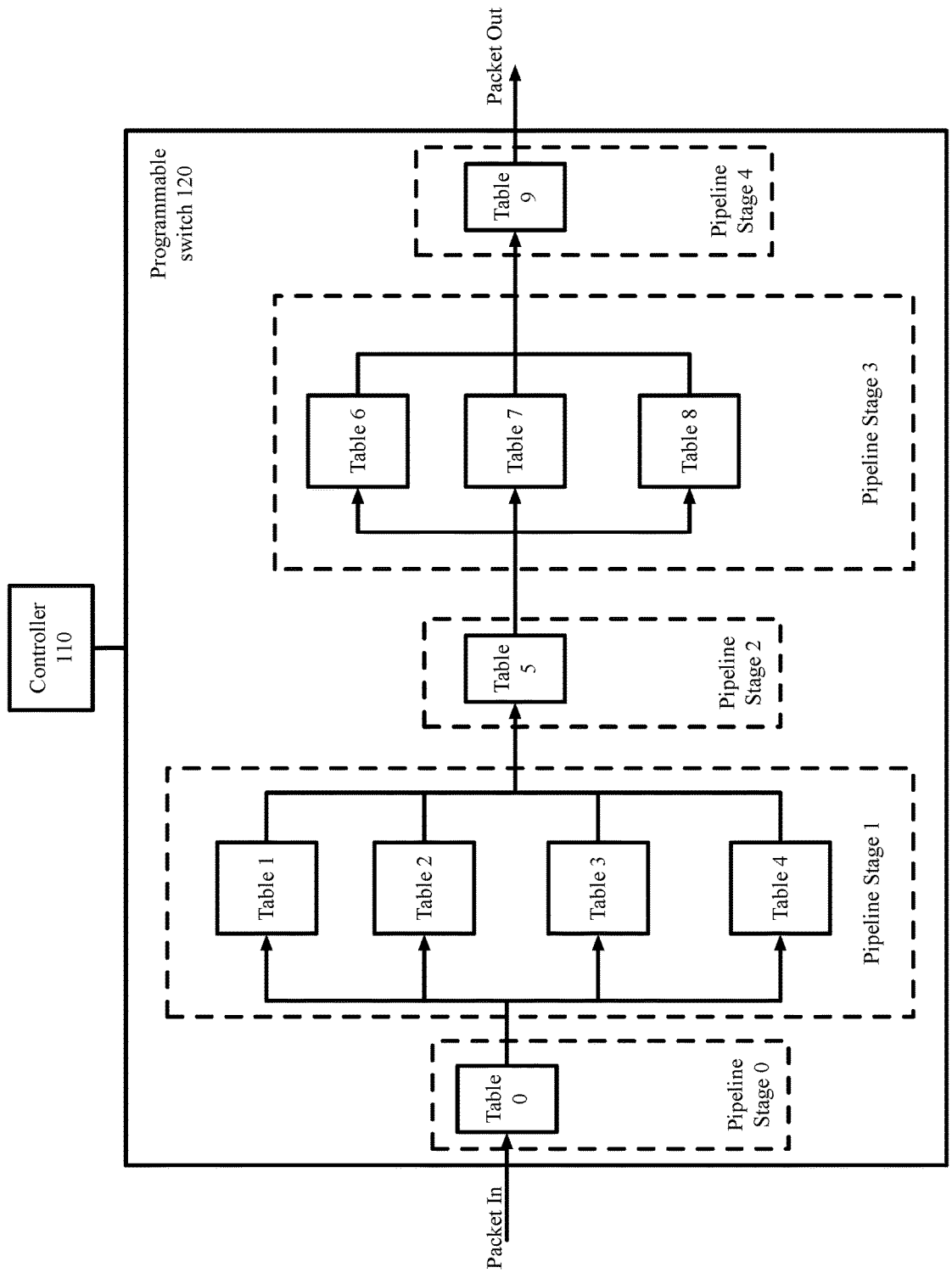
FIG. 7 is a diagram depicting a programmable switch compressing four tables and three tables into different pipeline stages, in accordance with certain examples.

FIG. 7 is a diagram depicting a programmable switch 120 compressing four tables and three tables into different pipeline stages, in accordance with certain examples. This example is similar to the process depicted in FIG. 6, but with additional tables being compressed.

As illustrated, a controller 110 communicates with a programmable switch 120. The programmable switch 120 receives a data packet as shown. The data packet is provided first to Table 0. Table 0 assesses the data packet and recognizes that the data packet has one of four mutually exclusive combinations of the flow entries, such as IPv4 or IPv6 Internet Protocol keys and TCP and UDP Layer4 Source and Destination ports. Tables 1 through 4 are illustrated as being in parallel in a single Pipeline Stage 2 such that Table 0 may forward the data packet to any one of Table 1, Table 2, Table 3, or Table 4 in pipeline stage 1, but not any two or more of Table 1, Table 2, Table 3, or Table 4.

In the example, Table 0 executes instructions to forward the data packet to one of Table 1, Table 2, Table 3, or Table 4 based on which of the four tables has the same combination of the Internet Protocol key and Layer4 Source and Destination ports as the data packet. Tables 1 through 4 are only able to forward the data packet to Pipeline Stage 2 or a later sequential pipeline stage and not to one of the parallel tables in pipeline stage 1.

In Pipeline Stage 2 of the example, Table 5 recognizes that other flow entries of the data packet are mutually exclusive and match with one of the tables in Pipeline Stage 3. Table 5 provides GoToTable instructions to forward the data packet to one of Table 6, Table 7, or Table 8 in pipeline stage 3 based on which of the tables will match the flow entries of the data packet. Table 6, Table 7, or Table 8 are only able to forward the data packet to Table 9 in pipeline stage 4, or an outlet port and not to one of the parallel tables in pipeline stage 3.

In the examples herein, two, three, and four tables are shown as being placed in single pipeline stages. Any other suitable number of flow tables may be placed in a single stage if the flow tables are independent of each other. For example, five, ten, fifty, one hundred, or any desired number of independent tables may be placed in a single pipeline stage when appropriate.

Example Systems

FIG. 8 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The example examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method, comprising:
by a computing device in a network system:
receiving data associated with pipeline capabilities of the computing device, the pipeline capabilities comprising a plurality of flow tables and allowable table transitions for each of the flow tables;
configuring a pipeline comprising the plurality of flow tables arranged in a sequential configuration;
after configuring the pipeline comprising the plurality of flow tables arranged in the sequential configuration, determining that a first flow table and a second flow table are mutually independent based on the allowable table transitions for each of the flow tables, wherein determining that the first flow table and the second flow table are mutually independent comprises determining that a path from the first flow table to the second flow table does not exist; and
after the determination that the first flow table and the second flow table are mutually independent, reconfiguring the pipeline in accordance with the pipeline capabilities for data flow in the computing device, the pipeline comprising a plurality of pipeline stages, a particular pipeline stage comprising the first flow table and the second flow table arranged in a parallel configuration.

2. The method of claim 1, further comprising:
receiving a first data packet by a preceding pipeline stage;
transmitting, by a preceding flow table in a preceding pipeline stage, the first data packet to the first flow table in the particular pipeline stage;
receiving a second data packet by the preceding pipeline stage; and
transmitting, by the preceding flow table in the preceding pipeline stage, the second data packet to the second flow table in the particular pipeline stage.

3. The method of claim 2, further comprising:
executing, by the first flow table, instructions provided in a set of flow entries of the first flow table to the first data packet; and
transmitting, by the first flow table, the first data packet to a subsequent table in a later pipeline stage in the pipeline.

4. The method of claim 3, wherein the instructions are executed based on a match of a set of flow entries of the first data packet with the set of flow entries of the first table.

5. The method of claim 3, wherein executing the instructions modifies one or more data entries of the first data packet.

6. The method of claim 3, wherein executing the instructions modifies a metadata value of the first data packet.

7. The method of claim 3, wherein executing the instructions modifies a next table to which the particular table is to direct the first data packet.

8. The method of claim 2, wherein the first data packet is only forwardable to the first flow table in the particular pipeline stage and not the second flow table in the particular pipeline stage based on flow entries of the first data packet and flow entries of the preceding flow table.

9. The method of claim 2, wherein data in the first data packet comprises one or more communication protocols.

10. The method of claim 1, further comprising:
by a controller of the network system:
configuring the data associated with the pipeline capabilities of the computing device; and
communicating the data to the computing device to configure the computing device.

11. The method of claim 1, wherein the first flow table and the second flow table are mutually independent when the first flow table in the pipeline may not transmit data packets to the second flow table.

12. The method of claim 1, wherein the received data is received from a network controller, and the computing device configures the flow tables in the pipeline based on the data.

13. The method of claim 1, wherein the computing device is a programmable switch.

14. The method of claim 13, wherein the programmable switch is an application specific integrated circuit.

15. The method of claim 1, wherein the pipeline capabilities further comprise a size of each of the flow tables.

16. The method of claim 1, further comprising:
creating a graph of the table transitions based on the received allowable table transitions; and
determining that the first flow table and the second flow table are mutually independent based on the graph.

17. The method of claim 16, wherein the graph is created with the plurality of flow tables depicted as nodes numbered sequentially and allowable table transitions as links between the nodes.

18. A computer program product, comprising:
a non-transitory computer-readable medium having computer-readable program instructions embodied thereon that, when executed by a computer, cause the computer to:
receive data associated with pipeline capabilities of the computer, the pipeline capabilities comprising a plurality of flow tables and allowable table transitions for each of the flow tables;
configure a pipeline comprising the plurality of flow tables arranged in a sequential configuration;
after configuring the pipeline comprising the plurality of flow tables in the sequential configuration, determine that a first table and a second table are mutually independent, wherein determining that the first flow table and the second flow table are mutually independent comprises determining that a path from the first flow table to the second flow table does not exist; and
after the determination that the first flow table and second flow table are mutually independent, reconfigure the pipeline in accordance with the pipeline capabilities for data flow in the computer, the pipeline comprising a plurality of pipeline stages, a particular pipeline stage comprising the first flow table and the second flow table arranged in a parallel configuration.

19. The computer program product of claim 18, further comprising computer-readable program instructions to:
receiving a first data packet in a preceding pipeline stage;
transmitting, by a preceding flow table, the first data packet to a first flow table in the particular pipeline stage;
receiving a second data packet; and
transmitting, by the preceding flow table, the second data packet to a second flow table in the particular pipeline stage.

20. A system, comprising:
a storage device; and
a processor in a network system communicatively coupled to the storage device, wherein the processor executes application code instructions that are stored in the storage device to cause the system to:
receive data associated with pipeline capabilities of the processor, the pipeline capabilities comprising a plurality of flow tables and allowable table transitions for each of the flow tables;
configure a pipeline comprising the plurality of flow tables arranged in a sequential configuration;
after configuring the pipeline comprising the plurality of flow tables in the sequential configuration, determine that a first flow table of the flow tables and a second flow table are mutually independent, wherein determining that the first flow table and the second flow table are mutually independent comprises determining that a path from the first flow table to the second flow table does not exist; and
after the determination that the first flow table and the second flow table are mutually independent, reconfigure the pipeline in accordance with the pipeline capabilities for data flow in the processor, the pipeline comprising a plurality of pipeline stages, a particular pipeline stage comprising the first flow table and the second flow table arranged in a parallel configuration.

* * * * *